United States Patent Office 3,450,683
Patented June 17, 1969

3,450,683
ORGANOMAGNESIUM - ZIRCONIUM BETA - DIKE-
TONES AS CATALYSTS FOR ALKENE OXIDE
POLYMERIZATION
Henry L. Hsieh and William R. Busler, Bartlesville, Okla.,
assignors to Phillips Petroleum Company, a corporation
of Delaware
No Drawing. Filed June 7, 1965, Ser. No. 462,103
Int. Cl. C08g 23/14; B01j 11/00
U.S. Cl. 260—88.3                                  4 Claims

ABSTRACT OF THE DISCLOSURE

Epoxide compounds are polymerized with a catalyst comprising (a) an organomagnesium compound and (b) a zirconium salt of a beta-diketone. The rubbery polymers produced have substantial utility in the automobile industry for fabricating articles such as motor mounts, body mounts, suspension parts, hoses, tubing and the like.

---

This invention relates to alkene oxide polymerization. In one aspect, this invention relates to catalyst systems for polymerizing epoxides. In another aspect, this invention relates to processes of polymerizing alkene oxides.

Several different processes of polymerizing alkene oxides are described in the patent art and in the technical literature. The catalyst systems employed in some of these prior art processes include mixtures of organoaluminum compounds and metal acetylacetonates. Specific catalyst systems within this group include triisobutylaluminum or diethylaluminum chloride and an acetylacetonate of a metal such as nickel, cobalt, iron, vanadium, chromium, or manganese. While catalyst systems of this type have been employed for polymerizing alkene oxides, in many instances the resulting polymer is a liquid with a relatively low molecular weight and very limited utility. Another shortcoming of the catalyst systems is the low monomer conversion rate. For these reasons, the catalyst systems of the prior art have not received widespread commercial success for producing polymers of alkene oxides.

According to this invention, these and other disadvantages of the prior art processes of polymerizing alkene oxides are overcome by providing a novel catalyst system comprising an organomagnesium compound and a zirconium salt of a beta-diketone. The catalyst system of this invention results in the formation of an olefin oxide polymer which is rubbery in nature. Monomer conversion is generally much higher with the catalysts of this invention than with the catalysts of the prior art. The novel catalysts of this invention can also be used for polymerizing two or more alkene oxides to form a copolymer. When one or more of the alkene oxides is unsaturated, the polymer product can be sulfur vulcanized.

Accordingly, it is an object of this invention to provide an improved process of polymerizing alkene oxides.

Another object of this invention is to provide a novel catalyst system for polymerizing alkene oxides.

A further object of this invention is to provide a process of polymerizing alkene oxides which will result in the formation of a polymer product which is sulfur vulcanizable.

Still another object of this invention is to provide a process of polymerizing alkene oxides wherein the monomer conversion is much higher than the monomer conversion by the processes of the prior art.

A still further object of this invention is to produce alkene oxide polymers which are flexible at low temperatures, and which are highly resistant to the effects of high temperatures and to the effects of ozone.

These and other objects of the invention will become apparent to one skilled in the art after studying the following detailed description and the appended claims.

In the practice of this invention, the organomagnesium-zirconium salt of a beta-diketone catalyst system can be utilized for polymerizing any alkene oxide. As an illustration, alkene oxides containing up to and including 20 carbon atoms per molecule can be polymerized by the process of this invention. Generally, it is preferred that the alkene oxide monomer contain from about 2 to about 8 carbon atoms. Alkene oxides which can be polymerized by the process of this invention can be represented by the formula

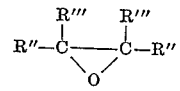

wherein R″ and R‴ are selected from the group consisting of hydrogen, saturated aliphatic, saturated cycloaliphatic, monoolefinic aliphatic, diolefinic aliphatic (conjugated and non-conjugated), monoolefinic cycloaliphatic, diolefinic cycloaliphatic (conjugated and non-conjugated), and aromatic radicals and combinations of these such as aralkyl, alkaryl, and the like. Some or all of the R″ and R‴ radicals can be halogen-substituted, and can contain oxygen in the form of an acyclic ether linkage (—O—) or an oxirane group

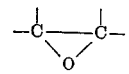

Further, the alkene oxides represented by the above formula can contain 1 or 2 olefinic linkages, 1 or 2 oxirane groups, and up to 1 ether linkage. In addition, both R‴ variables can represent divalent aliphatic hydrocarbon radicals which, together with the carbon atoms of the oxirane group, can form a cycloaliphatic hydrocarbon nucleus containing from about 4 to about 10 carbon atoms, and preferably from about 4 to about 8 carbon atoms.

Specific examples of some of the alkene oxides which are within the above structural formula and which can be homopolymerized or copolymerized in accordance with this invention are ethylene oxide (epoxyethane); 1,2-epoxypropane; 1,2-epoxybutane; 2,3 - epoxybutane; 1,2-epoxypentane; 2,3-epoxypentane; 1,2 - epoxyhexane; 3,4-epoxyhexane; 1,2-epoxyheptane; 2,3-epoxyoctane; 2,3-dimethyl-2,3 - epoxypentane; 1,2-epoxy-4-methylpentane; 2,3-epoxy-5-methylhexane; 1,2-epoxy-4,4-dimethylpentane; 4,5-epoxyeicosane; 1-chloro-2,3-epoxypropane (epichlorohydrin); 1 - bromo-2,3-epoxypropane; 1,5 - dichloro-2,3-epoxypentane; 2-iodo-3,4-epoxybutane; styrene oxide; 6-oxabicyclo[3·1·0]hexane; 7 - oxabicyclo[4·1·0]heptane; 3 - propyl-7-oxabicyclo[4·1·0] heptane; bis(2,3 - epoxybutyl)ether; tert-butyl 4,5-epoxyhexyl ether; and 2-phenylethyl 3,4-epoxybutyl ether.

Unsaturated alkene oxides within the above structural formula, including ethers, which can be homopolymerized or copolymerized with the saturated alkene oxides include allyl 2,3-epoxypropyl ether (allyl glycidyl ether); allyl 3,4-epoxybutyl ether; 1-methallyl 3,4-epoxyhexyl ether; 3-hexenyl 5,6-epoxyhexyl ether; 2,6-octadienyl 2,3,7,8-diepoxyoctyl ether; 6-phenyl-3-hexenyl 3-ethyl-5,6-epoxyhexyl ether; 3,4-epoxy-1-butene (butadiene monoxide); 3,4 - epoxy - 1 - pentene; 5 - phenyl - 3,4 - epoxy - 1 - pentene; 1,2,9,10 - diepoxy - 5 - decene; 6,7 - di - n - butyl-3,4,9,10-diepoxy-1,11-dodecadiene; epoxy vinyl ether; allyl 2-methyl-2,3-epoxypropyl ether; 3-cyclohexyl-2-propenyl 4-cyclohexyl-3,4-epoxybutyl ether; 2,4-pentadienyl 2,3-diethyl - 3,4 - epoxybutyl ether; 1 - methallyl 6 - phenyl-3,4-epoxyhexyl ether; 5 - (4-tolyl)2,3 - epoxypentyl vinyl ether; bis[4 - (3 - cyclopentenyl)2,3 - epoxybutyl] ether; 2 - (2,4 - cyclohexadienyl)ethyl 2,3 - epoxybutyl ether; 2-

(2,5-cyclohexadienyl)ethyl 2-benzyl-4,5-epoxypentyl ether; 3,4-epoxy-1,5-hexadienyl isopropyl ether; allyl 3,4-dimethyl - 3,4 - epoxyhexyl ether; 3,4 - epoxy - 4 - (2,3 - dimethylphenyl) 1 - butene; 3,4 - dimethyl - 3,4 - epoxy - 1 - pentene; 5 - (4 - methylcyclohexyl)3,4 - epoxy - 1 - pentene; 4,5 - diethyl - 4,5 - epoxy - 2,6 - octadiene; 4 - (2,4 - cyclopentadienyl) 1,2,6,7 - diepoxyheptane; and 1 - phenyl-1,2-epoxy-5,7-octadiene.

The novel catalyst system of this invention includes an organomagnesium compound and a zirconium salt of a beta-diketone. The organomagnesium compound of the catalyst can be represented by the formula

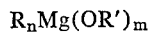

wherein each R and each R' can be the same or different and are hydrocarbon radicals selected from the group consisting of saturated aliphatic, saturated cycloaliphatic, and aromatic containing from 1 to 20 carbon atoms, inclusive; $n$ is an integer of from 1 to 2, inclusive; $m$ is an integer of from 0 to 1, inclusive; and the sum of the integers $n$ and $m$ equals the valence of the magnesium Mg. Exemplary organomagnesium compounds within the above general formula include dimethylmagnesium, diethylmagnesium, di-n-butylmagnesium, di-tert-butylmagnesium, di-n-dodecylmagnesium, di-n-eicosylmagnesium, methyl-n-propylmagnesium, dicyclohexylmagnesium, ethylcyclopentylmagnesium, diphenylmagnesium, di-4-tolylmagnesium, dibenzylmagnesium, ethylmagnesium methoxide, methylmagnesium n-butoxide, butylmagnesium isopropoxide, phenylmagnesium ethoxide, methylmagnesium methoxide, 2,3-diethylpentylmagnesium 3,5-di-n-heptylphenoxide, 11-(2,4,6-trimethylphenyl)hendecylmagnesium n-eicosoxide, 2-cyclohexylethylmagnesium 2-cyclohexylethoxide, and the like.

The zirconium salt of a beta-diketone in the catalyst system can be represented by the formula

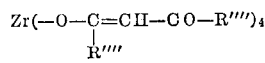

wherein each R'''' can be the same or different and is a radical selected from the group consisting of saturated aliphatic, saturated cycloaliphatic, and aromatic containing from 1 to 10 carbon atoms, inclusive, and combinations thereof such as alkaryl, aralkyl, and the like (Moeller, "Inorganic Chemistry," page 241, Wiley and Sons, 1952).

Specific beta-diketones which can be combined with zirconium to form the corresponding zirconium salt within the purview of the above formula include 2,4-pentanedione (acetylacetone); 3,5-heptanedione; 11,13-tricosanedione; 1,3-dicyclohexyl-1,3-propanedione; 1,5-dicyclopentyl-2,4-pentanedione; 1,3-diphenyl-1,3-propanedione; 1,5-diphenyl-2,4-pentanedione; 2,8-dimethyl-4,6-nonanedione; 1,3-di(4-n-butylphenyl)-1,3-propanedione; 1,11-diphenyl-5,7-hendecanedione; 1-phenyl-1,3-butanedione; 2,4-dicanedione; and 1-(3,5-dimethylcyclohexyl)-2,4-pentanedione.

The mole ratio of the organomagnesium compound to the zirconium salt of the beta-diketone in the catalyst system is within the range of from about 2:1 to about 100:1 and preferably in the range of from about 3:1 to about 30:1.

Although the amount of catalyst employed for effective polymerization of the alkene oxides is largely a matter of choice and can be varied over a relatively broad range, the catalyst level is preferably and for convenience determined on the basis of the organomagnesium component in the catalyst system. As a general rule, the amount of catalyst is maintained within the range of from about 1 to about 100 gram millimoles of organomagnesium compound per 100 grams of monomer being polymerized and preferably in the range of from about 5 to about 40 gram millimoles of organomagnesium compound per 100 grams of monomer. In the copolymerization of two or more alkene oxide monomers, the amount of catalyst is based on the total amount of all monomers.

The alkene oxide polymerization reaction of this invention can be carried out either as a batch process or as a continuous process with the novel catalyst system being added in a single initial charge or in predetermined increments during polymerization. Similarly, the monomers may be introduced into the reaction zone in one charge or they may be added gradually during polymerization. In order to expedite and improve the efficiency of the polymerization reaction, it is generally preferred that the reaction be carried out in the presence of an inert diluent. Suitable diluents which can be used for this purpose include paraffinic, cycloparaffinic, and aromatic hydrocarbons containing from about 4 to about 10 carbon atoms per molecule. Exemplary diluents which can be used are butane, pentane, hexane, decane, cyclopentane, cyclohexane, methylcyclohexane, benzene, toluene, xylene, ethylbenzene, and the like. It is also within the spirit and scope of this invention to employ halogenated hydrocarbons such as chlorobenzene and the like as diluents. Since the actual diluent employed is largely a matter of choice, it is obviously possible to employ other diluents than those herein identified without departing from the spirit and scope of the invention. Mixtures of suitable compounds can also be employed as diluents.

The temperature and pressure at which the polymerization process of this invention is effected can vary over a rather wide range. Generally, the polymerization is conducted at a temperature within the range of from about 40 to about 250° F. and preferably within the range of from about 85 to about 200° F. Polymerization is usually conducted at a pressure which will maintain the materials in the liquid state. It is obvious that the reaction can be conducted at superatmospheric pressures of several thousand pounds if desired.

The duration of the polymerization reaction will depend primarily upon the temperature and pressure. The process can be conducted for a period of from less than a minute to about 100 hours or more. A preferred range is from 10 minutes to about 50 hours.

The alkene oxide polymers produced in accordance with the novel catalyst system of this invention exhibit extremely good low temperature flexibility. The polymers are particularly resistant to the effects of heat and to the effects of ozone. The polymers of alkene oxides have unlimited utility in the automobile industry for fabricating articles such as motor mounts, body mounts, suspension system parts, hoses, and tubing.

The following examples will serve to illustrate the improved results obtained by polymerizing alkene oxides with the novel catalyst system of this invention. It is to be understood that such examples are for the purpose of illustration only, and that many variations and modifications can be made from the various examples by one skilled in the art without departing from the concept of this invention.

Examples 1 and 2

Two runs were conducted whereby 1,2-epoxypropane was polymerized by means of the novel catalyst system to illustrate its utility and operability. The two components of the catalyst used were diethylmagnesium and the zirconium salt of 2,4-pentanedione. The materials were charged to a reactor in the following proportions:

| | |
|---|---|
| 1,2-epoxypropane, parts by weight | 100 |
| Toluene, parts by weight | 860 |
| Diethylmagnesium, mhm.[1] | 40 |
| Zirconium salt of 2,4-pentanedione, mhm.[1] | Variable |
| Temperature, ° F. | 158 |
| Time, hours | 48 |

[1] Mhm.=gram millimoles per 100 grams monomer.

The polymerization technique employed involved the steps of charging the reactor with the toluene and thereafter purging it with nitrogen. The 1,2-epoxypropane was then passed to the reactor followed by the diethyl-magnesium and then the zirconium salt of 2,4-pentanedione. At the termination of each of the runs, the viscosity of the reaction mixture was reduced by diluting it with acetone, isopropyl alcohol, or a mixture of these materials. Approximately 1 weight percent, based on the polymer, of 2,2'-methylene-bis-(4-methyl-6-tert-butylphenol) antioxidant was added. The mixture was poured into water with high speed stirring and subsequently separated into an aqueous phase and an organic phase. The organic phase was removed and the polymer recovered from it by evaporating the diluent. The polymer product was then dried under vacuum. The polymers thus produced were rubbers and were observed to be gel-free. Table I below illustrates the properties of the polymers produced with this catalyst.

TABLE I

| Example No. | Metal salt of the beta-diketone | | Monomer conversion percent | Inherent viscosity |
|---|---|---|---|---|
| | Type | Mhm.[1] | | |
| 1 | Zirconium acetylacetonate. | 4 | 85 | 5.16 |
| 2 | do | 10 | 78 | 8.73 |

[1] Mhm.=gram millimoles per 100 grams monomer.

In order to determine the inherent viscosity, one-tenth gram of polymer was placed in a wire cage made from 80-mesh screen and the cage was placed in 100 ml. of toluene contained in a wide-mouth, 4-ounce bottle. After standing at room temperature (approximately 77° F.) for about 24 hours, the cage was then removed and the solution filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

Several additional runs were made wherein 1,2-epoxypropane was polymerized with other metal salts of beta-diketones being substituted for the zirconium salt in the catalyst of this invention. Two runs were also made wherein titanium tetrachloride was substituted for the zirconium salt in the catalyst system of this invention. Polymerization was conducted using the same technique as that employed in Examples 1 and 2. The ingredients were added to the reaction vessel in the same proportions as were used in Examples 1 and 2. The results of the several runs conducted are reported in Table II below.

TABLE II

| Run No. | Metal salt of the beta-diketone | | Monomer conversion (percent) |
|---|---|---|---|
| | Type | Mhm.[1] | |
| 1 | Vanadium acetylacetonate | 4 | 15 |
| 2 | do | 10 | 20 |
| 3 | Magnesium acetylacetonate·H₂O | 4 | 8 |
| 4 | do | 10 | 10 |
| 5 | Calcium acetylacetonate | 4 | Trace |
| 6 | do | 10 | 8 |
| 7 | Barium acetylacetonate | 4 | Trace |
| 8 | do | 10 | 6 |
| 9 | Beryllium acetylacetonate | 4 | Trace |
| 10 | do | 10 | 10 |
| 11 | Chromium acetylacetonate | 4 | 12 |
| 12 | do | 10 | Trace |
| 13 | Manganese acetylacetonate | 4 | 10 |
| 14 | do | 10 | Trace |
| 15 | do | 4 | 10 |
| 16 | do | 10 | Trace |

[1] Mhm.=gram millimoles per 100 grams monomer.

In the runs using titanium tetrachloride, 33 percent monomer conversion was obtained with 4 gram millimoles of titanium tetrachloride per 100 grams of monomer and only a trace of polymer was obtained using 10 gram millimoles of titanium tetrachloride per 100 grams of monomer.

By comparing the results reported in Tables I and II, it is obvious that the catalyst having the zirconium salt is superior to the catalysts which contain the other metal salts of the beta-diketones. The catalyst having the zirconium salt is also superior to the catalyst having the titanium tetrachloride. Monomer conversion is materially increased with the catalyst of this invention.

Example 3

Allyl glycidyl ether was copolymerized with 1,2-epoxypropane by means of a catalyst system comprising diethylmagnesium and the zirconium salt of 2,4-pentanedione. The components were employed in the following proportions:

| | |
|---|---|
| 1,2-epoxypropane, parts by weight | 92 |
| Allyl glycidyl ether, parts by weight | 8 |
| Toluene, parts by weight | 860 |
| Diethylmagnesium, mhm.[1] | 40 |
| Zirconium salt of 2,4-pentanedione, mhm.[1] | 8 |
| Temperature, °F. | 158 |
| Time, hours | 48 |

[1] Mhm.=gram millimoles per 100 grams monomer.

The technique used for effecting the copolymerization reaction was the same as the technique used in Examples 1 and 2. The monomer conversion was measured and found to be about 61 percent. The polymer produced was a sulfur-vulcanizable rubber thus illustrating the feasibility of using the catalyst system for producing copolymers which can be vulcanized.

A control run was made using the components in the same proportions as described above except that the zirconium salt of 2,4-pentanedione was omitted. The copolymerization reaction was conducted under the same conditions as Example 3 with the same technique employed. The reaction was stopped at the end of 48 hours and the percent monomer conversion measured and found to be only 7 percent.

Example 4

A polymer of 1,2-epoxypropane was produced in the presence of a catalyst system comprising butylmagnesium isopropoxide and zirconium salt of 2,4-pentanedione. The components were employed in the following proportions:

| | |
|---|---|
| 1,2-epoxypropane, parts by weight | 100 |
| Toluene, parts by weight | 860 |
| Butylmagnesium isopropoxide, mhm.[1] | 30 |
| Zirconium salt of 2,4-pentanedione, mhm.[1] | 4 |
| Temperature, °F. | 158 |
| Time, hours | 48 |

[1] Mhm.=gram millimoles per 100 grams monomer.

The technique employed for effecting the polymerization was the same as that used in Examples 1 and 2. The monomer conversion was measured and found to be about 45 percent at the end of 48 hours. The polymer produced was rubbery in nature.

A control run was made using the same materials in the same proportions and the same conditions as described next above except that the zirconium salt of 2,4-pentanedione was omitted from the catalyst. No polymer was formed during the 48-hour period.

Although the invention has been described in considerable detail, it must be understood that such detail is for the purpose of illustration only and that many variations and modifications can be made by one skilled in the art without departing from the spirit and scope of the invention.

We claim:

1. A process of producing a polymer of an epoxide compound which comprises polymerizing an alkene oxide of the formula

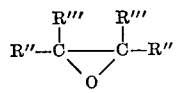

wherein each R″ and each R‴ can be the same or different and are selected from the group consisting of hydrogen, saturated aliphatic, saturated cycloaliphatic, monoolefinic aliphatic, diolefinic aliphatic, monoolefinic cycloaliphatic, diolefinic cycloaliphatic, and aromatic radicals, halogen-substituted forms of said radicals, and combinations thereof, and said radicals, their halogen-substituted forms and combined forms can contain oxygen in the form of an acyclic ether linkage (—O—) or an oxirane group

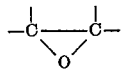

and said alkene oxide can contain 1 or 2 olefinic linkages, 1 or 2 oxirane groups, and 1 ether linkage, and both R‴ variables in said alkene oxide can represent a divalent hydrocarbon radical which together with the oxirane group in said alkene oxide can form a cycloaliphatic nucleus, said process comprising contacting said alkene oxide with a catalyst comprising:

(a) an organomagnesium compound of the formula $$R_nMg(OR')_m$$

wherein each R and each R′ can be the same or different and are hydrocarbon radicals selected from the group consisting of saturated aliphatic, saturated cycloaliphatic, and aromatic containing from 1 to 20 carbon atoms, inclusive; $n$ is an integer of from 1 to 2, inclusive; $m$ is an integer of from 0 to 1, inclusive; and the sum of the integers $n$ and $m$ equals the valence of the magnesium Mg; and (b) a zirconium salt of a beta-diketone of the formula

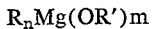

wherein each R″″ can be the same or different and is a radical selected from the group consisting of saturated aliphatic, saturated cycloaliphatic, and aromatic containing from 1 to 10 carbon atoms, inclusive;

wherein said organomagnesium compound is present in an amount from about 1 to about 100 gram millimoles per 100 grams of alkene oxide, and wherein the mol ratio of said organomagnesium compound to said zirconium salt is within the range of from about 2:1 to about 10:1.

2. A process according to claim 1 wherein the organomagnesium compound is diethylmagnesium and the beta-diketone is 2,4-pentanedione.

3. A process according to claim 1 wherein the organomagnesium compound is butylmagnesium isopropoxide and the beta-diketone is 2,4-pentanedione.

4. A process of producing a copolymer of allyl glycidyl ether and 1,2-epoxypropane comprising charging a liquid diluent to a reaction zone; charging allyl glycidyl ether to said reaction zone; charging 1,2-epoxypropane to said reaction zone; passing a catalyst comprising diethylmagnesium and zirconium salt of 2,4-pentanedione to said reaction zone to effect formation of the copolymer; wherein said diethylmagnesium being present in an amount from about 1 to about 100 gram millimoles per 100 grams total of allyl glycidyl ether and 1,2-epoxypropane, and wherein the mol ratio of said diethylmagnesium to said zirconium salt of 2,4-pentanedione is within the range of from about 2:1 to about 100:1; and recovering the copolymer so produced.

References Cited

UNITED STATES PATENTS 3,234,251  2/1966  Garty et al.

OTHER REFERENCES

Kambara et al., J. Pol. Sci., vol. 51–53 (1961), p. S 7–10.

HARRY WONG, JR., *Primary Examiner*.

U.S. Cl. X.R.

252—431; 260—2, 79.5